United States Patent
Pantelidou et al.

(10) Patent No.: US 12,470,950 B2
(45) Date of Patent: Nov. 11, 2025

(54) VALIDITY INDICATION AS A FUNCTION OF CONFIDENCE LEVEL

(71) Applicant: NOKIA TECHNOLOGIES OY, Espoo (FI)

(72) Inventors: Anna Pantelidou, Antony (FR); Anatoly Andrianov, Schaumburg, IL (US)

(73) Assignee: Nokia Technologies Oy, Espoo (FI)

( * ) Notice: Subject to any disclaimer, the term of this patent is extended or adjusted under 35 U.S.C. 154(b) by 464 days.

(21) Appl. No.: 17/980,266

(22) Filed: Nov. 3, 2022

(65) Prior Publication Data
US 2024/0155377 A1    May 9, 2024

(51) Int. Cl.
*H04W 24/02* (2009.01)
*H04L 41/147* (2022.01)
*H04L 41/16* (2022.01)

(52) U.S. Cl.
CPC ........... *H04W 24/02* (2013.01); *H04L 41/147* (2013.01); *H04L 41/16* (2013.01)

(58) Field of Classification Search
CPC ..... H04L 41/147; H04L 41/16; H04L 41/142; H04L 41/12; H04L 41/40; H04L 67/10; H04L 67/12; H04L 41/0681; H04L 41/069; H04L 41/0677; H04L 41/0636; H04L 41/145; H04L 43/16; H04W 24/04; H04W 24/02; H04W 24/08; H04W 24/10; H04W 74/08; H04W 16/22; H04W 24/06; H04W 28/0221
See application file for complete search history.

(56) References Cited

U.S. PATENT DOCUMENTS

| | | | | |
|---|---|---|---|---|
| 10,116,521 B2 * | 10/2018 | Kokkula | ............. | H04L 41/0823 |
| 2018/0046926 A1 * | 2/2018 | Achin | .................. | G06F 9/5011 |
| 2019/0036788 A1 * | 1/2019 | Gupta | .................. | H04L 43/087 |
| 2020/0257992 A1 | 8/2020 | Achin et al. | | |
| 2022/0083916 A1 * | 3/2022 | Khan | ..................... | G06N 20/00 |

FOREIGN PATENT DOCUMENTS

| | | | | | |
|---|---|---|---|---|---|
| GB | | 2603469 A | * | 8/2022 | ............. H04L 41/16 |
| JP | | 2018067113 A | * | 4/2018 | ........... G06F 9/5027 |
| WO | | 2022/156906 A1 | | 7/2022 | |

OTHER PUBLICATIONS

Extended European Search Report corresponding to EP 23203742. 4, dated Mar. 21, 2024.

* cited by examiner

*Primary Examiner* — Quan M Hua
(74) *Attorney, Agent, or Firm* — Lippes Mathias LLP

(57) ABSTRACT

Systems, methods, apparatuses, and computer program products for indicating validity as a function of confidence level. A requesting network entity may receive a prediction request from a requesting network entity that comprises timing information indicating when a prediction needs to be obtained. The receiving entity may then transmit a response to the requesting network entity associated with the requested prediction.

7 Claims, 15 Drawing Sheets

VALIDITY INDICATION AS A FUNCTION OF CONFIDENCE LEVEL

TECHNICAL FIELD

Some example embodiments may generally relate to mobile or wireless telecommunication systems, such as $3^{rd}$ Generation Partnership Project (3GPP) Long Term Evolution (LTE), $5^{th}$ generation (5G) radio access technology (RAT), new radio (NR) access technology, $6^{th}$ generation (6G), and/or other communications systems. For example, certain example embodiments may relate to systems and/or methods for indicating validity as a function of confidence level.

BACKGROUND

Examples of mobile or wireless telecommunication systems may include radio frequency (RF) 5G RAT, the Universal Mobile Telecommunications System (UMTS) Terrestrial Radio Access Network (UTRAN), LTE Evolved UTRAN (E-UTRAN), LTE-Advanced (LTE-A), LTE-A Pro, NR access technology, and/or MulteFire Alliance. 5G wireless systems refer to the next generation (NG) of radio systems and network architecture. A 5G system is typically built on a 5G NR, but a 5G (or NG) network may also be built on E-UTRA radio. It is expected that NR can support service categories such as enhanced mobile broadband (eMBB), ultra-reliable low-latency-communication (URLLC), and massive machine-type communication (mMTC). NR is expected to deliver extreme broadband, ultra-robust, low-latency connectivity, and massive networking to support the Internet of Things (IoT). The next generation radio access network (NG-RAN) represents the radio access network (RAN) for 5G, which may provide radio access for NR, LTE, and LTE-A. It is noted that the nodes in 5G providing radio access functionality to a user equipment (e.g., UE 1420 as illustrated in FIG. 14) may be referred to as next-generation Node B (gNB) when built on NR radio, and may be referred to as next-generation eNB (NG-eNB) when built on E-UTRA radio.

SUMMARY

In accordance with some example embodiments, a method may include receiving a prediction request from a requesting network entity comprising timing information indicating when a prediction needs to be obtained. The method may further include determining whether the prediction request is critical or non-critical.

In accordance with certain example embodiments, an apparatus may include means for receiving a prediction request from a requesting network entity comprising timing information indicating when a prediction needs to be obtained. The apparatus may further include means for determining whether the prediction request is critical or non-critical.

In accordance with various example embodiments, a non-transitory computer readable medium may include program instructions that, when executed by an apparatus, cause the apparatus to perform at least a method. The method may include receiving a prediction request from a requesting network entity comprising timing information indicating when a prediction needs to be obtained. The method may further include determining whether the prediction request is critical or non-critical.

In accordance with some example embodiments, a computer program product may perform a method. The method may include receiving a prediction request from a requesting network entity comprising timing information indicating when a prediction needs to be obtained. The method may further include determining whether the prediction request is critical or non-critical.

In accordance with certain example embodiments, an apparatus may include at least one processor and at least one memory storing instructions that, when executed by the at least one processor, cause the apparatus at least to receive a prediction request from a requesting network entity comprising timing information indicating when a prediction needs to be obtained. The at least one memory and instructions, when executed by the at least one processor, may further cause the apparatus at least to determine whether the prediction request is critical or non-critical.

In accordance with various example embodiments, an apparatus may include receiving circuitry configured to receive a prediction request from a requesting network entity comprising timing information indicating when a prediction needs to be obtained. The apparatus may further include determining circuitry configured to determine whether the prediction request is critical or non-critical.

In accordance with some example embodiments, a method may include transmitting a prediction request to a receiving network entity comprising timing information indicating when the prediction needs to be obtained and an indication of confidence. The method may further include receiving a response from the receiving network entity associated with the requested prediction.

In accordance with certain example embodiments, an apparatus may include means for transmitting a prediction request to a receiving network entity comprising timing information indicating when the prediction needs to be obtained and an indication of confidence. The apparatus may further include means for receiving a response from the receiving network entity associated with the requested prediction.

In accordance with various example embodiments, a non-transitory computer readable medium may include program instructions that, when executed by an apparatus, cause the apparatus to perform at least a method. The method may include transmitting a prediction request to a receiving network entity comprising timing information indicating when the prediction needs to be obtained and an indication of confidence. The method may further include receiving a response from the receiving network entity associated with the requested prediction.

In accordance with some example embodiments, a computer program product may perform a method. The method may include transmitting a prediction request to a receiving network entity comprising timing information indicating when the prediction needs to be obtained and an indication of confidence. The method may further include receiving a response from the receiving network entity associated with the requested prediction.

In accordance with certain example embodiments, an apparatus may include at least one processor and at least one memory storing instructions that, when executed by the at least one processor, cause the apparatus at least to transmit a prediction request to a receiving network entity comprising timing information indicating when the prediction needs to be obtained and an indication of confidence. The at least one memory and instructions, when executed by the at least one processor, may further cause the apparatus at least to receive a response from the receiving network entity associated with the requested prediction.

In accordance with various example embodiments, an apparatus may include transmitting circuitry configured to transmit a prediction request to a receiving network entity comprising timing information indicating when the prediction needs to be obtained and an indication of confidence. The apparatus may further include receiving circuitry configured to receive a response from the receiving network entity associated with the requested prediction.

BRIEF DESCRIPTION OF THE DRAWINGS

For a proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for indicating validity as a function of confidence level is not intended to limit the scope of certain example embodiments, but is instead representative of selected example embodiments.

Artificial intelligence (AI)/machine learning (ML) in RAN is continuing to be developed, including a functional framework that introduces AI/ML, functionality in the RAN, as well as inputs and outputs needed by an AI/ML algorithm. In particular, there is a need to identify data required by an AI/ML function as the input, the data produced as the output, and standardization impacts at a node in an existing architecture or in the network interfaces to transfer this input/output data through them.

Figure 1:
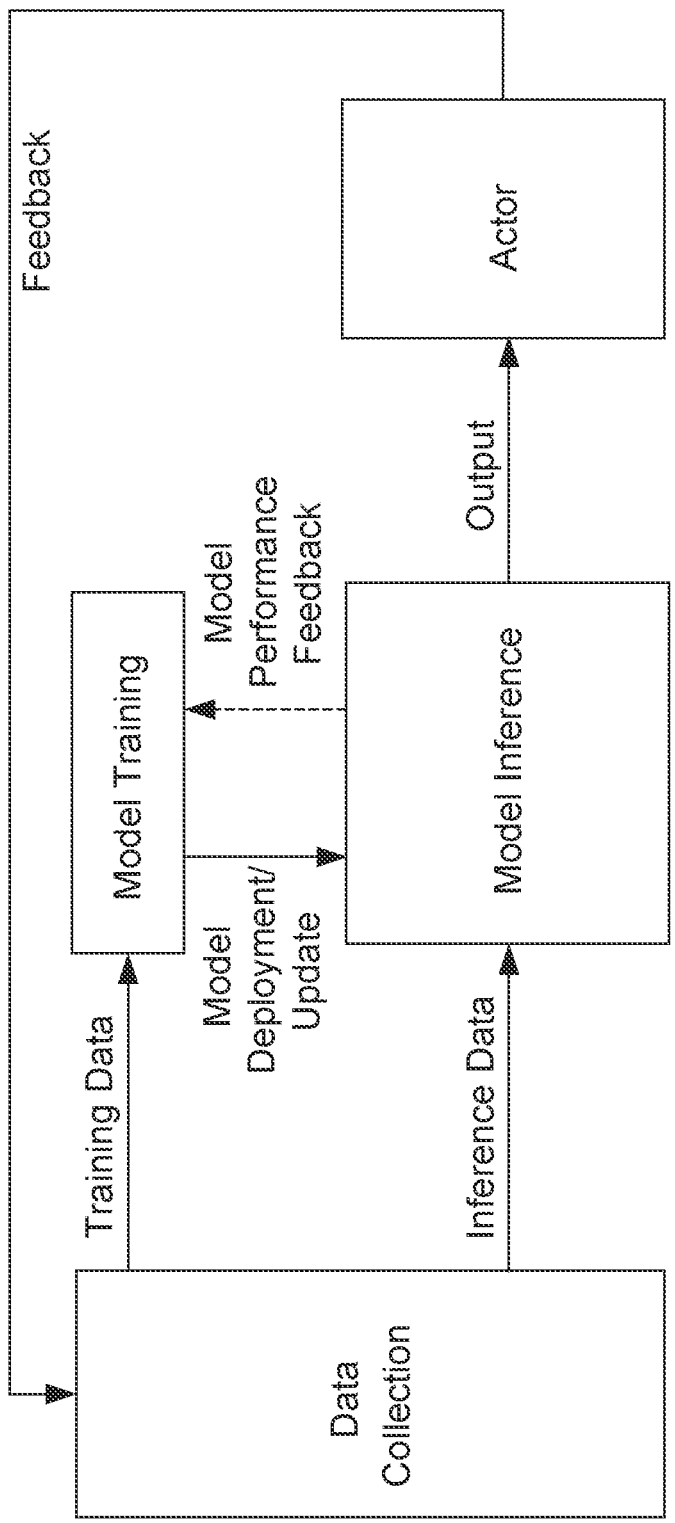
FIG. 1 illustrates a functional framework for AI/ML RAN intelligence.

An example AI/ML framework is depicted in FIG. 1, wherein AI/ML model training may be performed in an OAM or AI/ML, model training may be located at an NG-RAN node such as a gNB or in case of split architecture, a gNB-CU, a gNB-CU-CP, a gNB-CU-UP or a gNB-DU. AI/ML Training may take place in one or more entities depending the scenario, e.g., AI/ML model training may be located both at a gNB-CU and at a gNB-DU or both in OAM and in the gNB, to give an example. In addition, an AI/ML model inference may be located in the gNB or in case of split architecture, a gNB-CU, a gNB-CU-CP, a gNB-CU-UP or a gNB-DU. Information input to the AI/ML function from a neighbor gNB may be a prediction, such as a predicted resource status information or predicted energy efficiency. The framework may also take into account time of validity of a prediction. For example, the framework may take into how long a prediction received by a neighboring node is valid. AL/ML-based energy saving, load balancing, and mobility optimization may be related to predicted resource status information over Xn Interface. In some cases, validity time for a prediction may be used as a local node model input and/or output without affecting standards.

A predictive model may be used to generate predictions of how frequently a certain value of a random variable may occur. Thus, a prediction pertains to a random variable, and is based on a probability rather than certainty; hence, a prediction is not perfect. In addition, the accuracy of predictions can be affected by the further into the future the prediction is made. For example, if the variable to be predicted is the load of a neighboring gNB, the prediction may be more reliable if load is predicted sooner (e.g., after 1 minute) rather than later (e.g., after 1 hour or after 1 day). Since the number of observations is small (predicting a value in the near future), models may work reasonably well as an approximation to the process that generated the data. When the number of observations increases (predicting a value far in the future), the number of different options may also increase, rendering the prediction more unreliable. At the same time, optimization may become more time consuming since the number of the observations involved is also higher.

Figure 2:
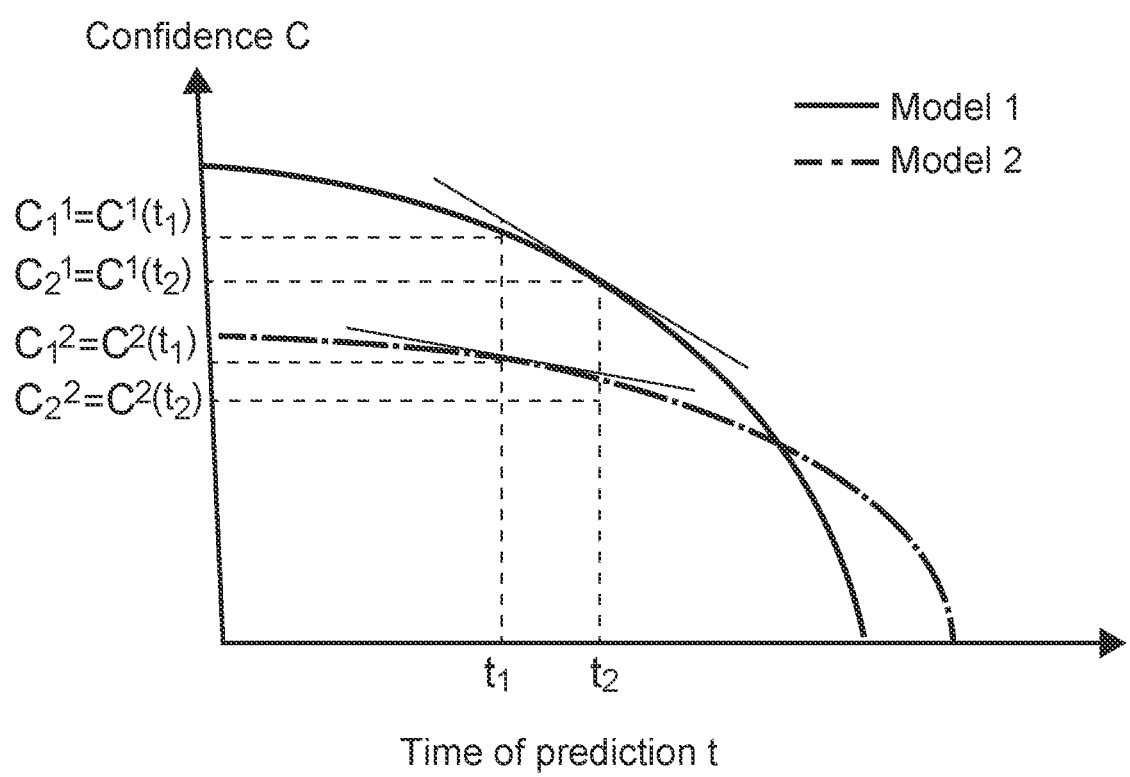
FIG. 2 illustrates confidence of a prediction as a function of time in future when a prediction is provided for two different models that could produce the prediction.

A confidence model may be configured to take prediction uncertainties into account, especially when a prediction is utilized by systems, entities, and algorithms residing at network nodes that differ from the node where the prediction was generated. FIG. 2 illustrates the confidence of a prediction as a function of time in the future from the request of the prediction. Specifically, the farther into the future that a prediction is requested, the lower the confidence with which a predictive model can produce the prediction. In addition, two different models for the same prediction may have different confidence or reliability when a prediction is requested for a given time into the future (e.g., at time $t_2$ the confidence of Model 1 is higher than the confidence of Model 2) or the same confidence (e.g., at the crossing point of the two curves corresponding to models 1 and 2). The slope between $t_1$ and $t_2$ in model 1 is steeper than the slope under model 2, meaning that the rate with which confidence decreases is lower.

The rate at which the reliability of prediction decays over time may depend on many internal and implementation specific parameters of the model (e.g., specific algorithm used, input information, information to be predicted and its granularity, or the like). The reliability of a prediction at the prediction-requested time is not known to the requesting node, even though this may be essential information for usability of prediction. If a node requests from a neighbor predictions too far in the future, the reliability of these predictions may be unusable by the requesting node.

In addition, during the prediction reporting procedure, a node providing predictions may use a single or multiple AI/ML models to generate the predictions for the requesting node. If different models are used, the reliability of different predictions provided may differ, even within the time same horizon into the future.

Certain example embodiments described herein may have various benefits and/or advantages to overcome the disadvantages described above. For example, certain example embodiments may allow a node requesting a prediction in the future to flexibly determine whether the prediction satisfies a given confidence or not. For example, a prediction may be useful at the source if a target node confirms that the provided prediction will meet a confidence level. Alternatively, the node providing the prediction may indicate a rate of decrease, for example, by allowing the node to receive an indication of the slope of the confidence function at the time a prediction is requested. Various example embodiments may also allow also flexibility since the confidence of a prediction may not necessarily need to meet the requirement placed by the requesting node as long as is deviates sufficiently little (if its slope is very smooth). Thus, certain example embodiments discussed below are directed to improvements in computer-related technology.

Certain example embodiments may express the time interval at which a prediction remains valid as a non-increasing function of a confidence at the prediction request time, or as a non-increasing function of a validity period starting at the requested time of the prediction. The confidence function may be a concave function of time if it depends on the time of prediction. The confidence function may be a concave plane if it is a function of two variables (e.g., a time and a time duration). A confidence-constrained framework may exchange predictions between two NG-RAN nodes in order to indicate prediction validity. Such a confidence-constrained framework may request and retrieve predictions of a given confidence or of a constrained confidence decay, and provide alternative signaling options when a certain confidence cannot be provided by a node at the requested time.

In some example embodiments, a cause value may indicate that a confidence level of prediction is not met and a node cannot provide the requested prediction. In some other examples, a different cause value may indicate that even though a confidence is not met the prediction is still close enough (according to a threshold) to the requested confidence value. Various example embodiments may also include signaling to provide predictions not meeting the original request, and indicate critical prediction and trigger retraining at the node running ML inference, for example, when the prediction is critical for the requesting node's operation. In addition, various example embodiments may include a counter to report confidence-related prediction abnormalities to an OAM that hosts an AI/ML training algorithm.

As summarized above, confidence may be expressed through a non-increasing function of time, or a non-increasing function of a validity interval. Confidence may also be expressed in terms of a decay at a time of prediction. A node may still assume that a prediction is valid even if the confidence expectation is not met, if the decay of confidence is below a threshold, defined by the node, or if the derivative of the confidence function is close to 0 (i.e., moderate slope indicates that confidence is not changing fast).

In certain example embodiments, predictions meeting a confidence requirement may be requested and provided in a soft way, allowing the node producing the predictions to provide the latter with alternative methods when possible (without mandating providing those predictions). Alternatively, predictions meeting a confidence requirement may be requested to be provided in a mandatory way, thereby forcing the node providing the predictions to provide those predictions through different approaches (e.g., through retraining (or requesting retraining) of the model or through updating the time input in the inference function to match the requested confidence).

A first node may subscribe to a single prediction or to a sequence of predictions from a second, neighboring node constrained by a certain reliability/confidence. A series of predictions can be subscribed to through a variety of techniques. For example, a periodic scheme may enable the node subscribing to predictions to indicate a starting time when the first prediction is to be calculated together with a period at which the subsequent predictions are to be obtained. For example, if (t, T) is indicated, then the first prediction may be calculated at time t, and the subsequent predictions may occur every T units of time.

In some example embodiments, an aperiodic technique may enable a series of time instances in the future to be indicated, which may require the receiving node to calculate predictions at those times. For instance, $(t_1, t_2, \ldots t_K)$ may imply that the receiving node should calculate a prediction at time instances $t_1, t_2, \ldots t_K$.

In various example embodiments, a triggering event may be indicated in the reporting by the first node so that the second node starts reporting a prediction when the event occurs (e.g., when a predicted energy efficiency or resource status information exceeds a threshold or drops below a threshold or when other inference information gets updated). The node receiving the request may execute inference, but may not report it to the neighbor before the event is met. As an example, the node may append the inference corresponding with the event and all the history of inference that occurred before the event was satisfied.

In certain example embodiments, the reliability of the prediction may depend on the model used to calculate the prediction, the input information to the ML model, and the amount of time into the future that a prediction is requested. In some cases, the requested confidence of a certain prediction may not be provided by a neighbor; thus, a cause value in the procedure communicating prediction information between neighbors may indicate that requested confidence is not achievable.

In some example embodiments, a prediction request may indicate a set of prediction requirements (e.g., with respect to a confidence) that the prediction needs to satisfy. Additionally, and optionally, the prediction request may include an indication of whether a target node can take further actions to meet the prediction requirements in case those are not met providing, including assistance information such as through soft timing information or retraining. This may be performed using a critical indication. The list of assistance information may be ordered or unordered. In a non-critical case, if a prediction meeting the requirement/confidence can be provided, it may be sent to a requesting node. If not, an appropriate cause value may be sent. In both options, the node providing the prediction may indicate that the prediction cannot be provided through an appropriate cause value (e.g., confidence not met"). Thus, a prediction requirement may include timing information and/or confidence.

Figure 3:
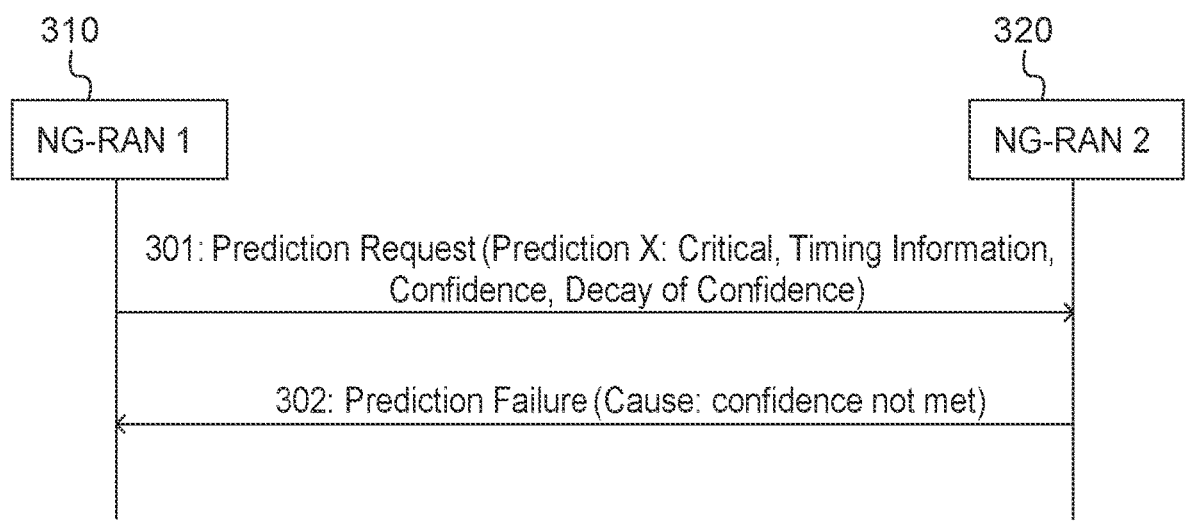
FIG. 3 illustrates an example of a signaling diagram where a prediction reporting procedure fails due to the fact that the provided prediction by a neighboring node does not meet the confidence/reliability requirements placed by the requesting node according to certain example embodiments.
Figure 14:
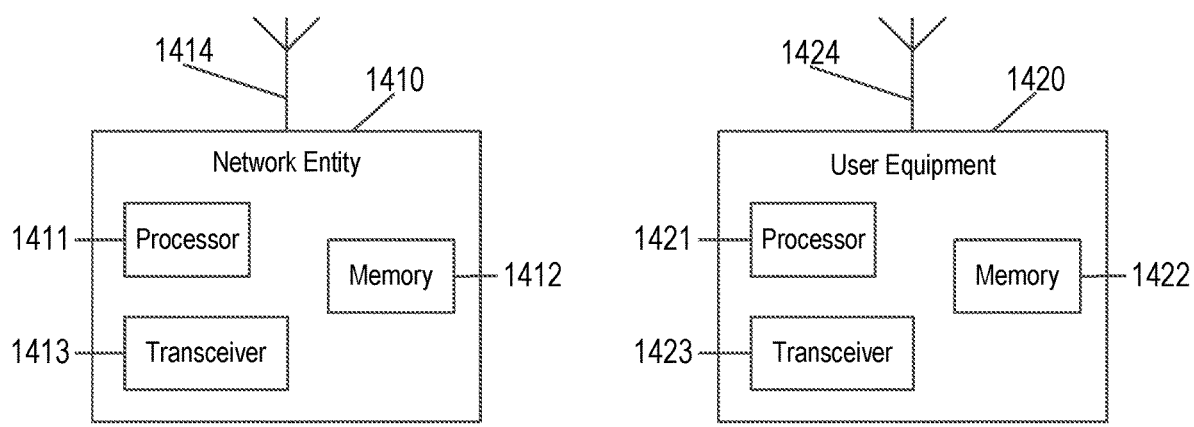
FIG. 14 illustrates an example of various network devices according to some example embodiments.

FIG. 3 illustrates an example of a signaling diagram depicting a situation where a prediction reporting procedure fails due to the fact that the provided prediction by a neighboring node does not meet the confidence/reliability requirements placed by the requesting node. NE 310 and NE 320 may be similar to NE 1410, as illustrated in FIG. 14, according to certain example embodiments. In this example, NE 310 may be a requesting node that requests prediction X from NE 320 where the prediction needs to be calculated at the time indicated by the timing information and must meet a confidence requirement (e.g., 90% confidence). The confidence requirement may implicitly place a requirement on the time that the prediction is valid even though the validity time could also be explicitly indicated in some examples.

Specifically, if the indicated confidence/reliability is not satisfied by the calculated predictions, NE 320 may not provide those predictions to NE 310, but should return a failure instead, with an indication (e.g., through a cause value) that the confidence was not met for this prediction. A new cause value could be introduced to indicate when a requested prediction does not meet the requirements of the prediction request. NE 320 may provide a subset of the predictions that meet the reliability, and indicate the cause value for predictions that do not meet reliability. In this example, support of the requested prediction by an NG-RAN node is non-critical, allowing NE 320 to ignore the request if the requested confidence is not met and provide an appropriate cause value. This may be signaled to a neighbor by an indication that the prediction is non-critical in the requesting message.

At 301, NE 310 may request a prediction from NE 320. NE 310 may include timing information in the request indicating when the prediction needs to be obtained. Timing information per requested prediction may correspond to a timing instance, to an interval of time indicated by two time instances $(t_1, t_2)$, or to a time instance and a time duration $(t_1, T)$.

In certain example embodiments, NE 310 may indicate in the request a confidence/reliability that the prediction needs to satisfy. For example, a confidence may be a number in interval [0,1], with 0 indicating that no confidence guarantees are needed for the prediction, and 1 indicating that the prediction needs to be 100% accurate. In addition, and optionally, NE 310 may include a "decay of confidence," whereby if the confidence curve is a continuous function, it may correspond to the slope of the curve at the prediction time (i.e., the derivative at this point or the difference of the confidences between different points of the time interval divided by the length of the time interval between these points).

At 302, NE 320 may respond to NE 310 with a cause value "confidence not met" if NE 320 cannot provide a prediction meeting the required confidence.

In some example embodiments, decay of confidence may not be sent in the prediction request by NE 310, but by NE 320. In particular, NE 310 may request a prediction at a certain time with a certain confidence. NE 320 may respond with the requested prediction together with an indication for how long this prediction will be valid also called as a validity time. This may be included as a time value (e.g., may be valid for 2 minutes) or this can be indicated by a decay of confidence slope telling how fast the confidence changes with time. This may provide assistance information to NE 310 to determine, for example, whether it wants to use the prediction, when it can use the prediction, and for how long the prediction can be used.

Figure 4:
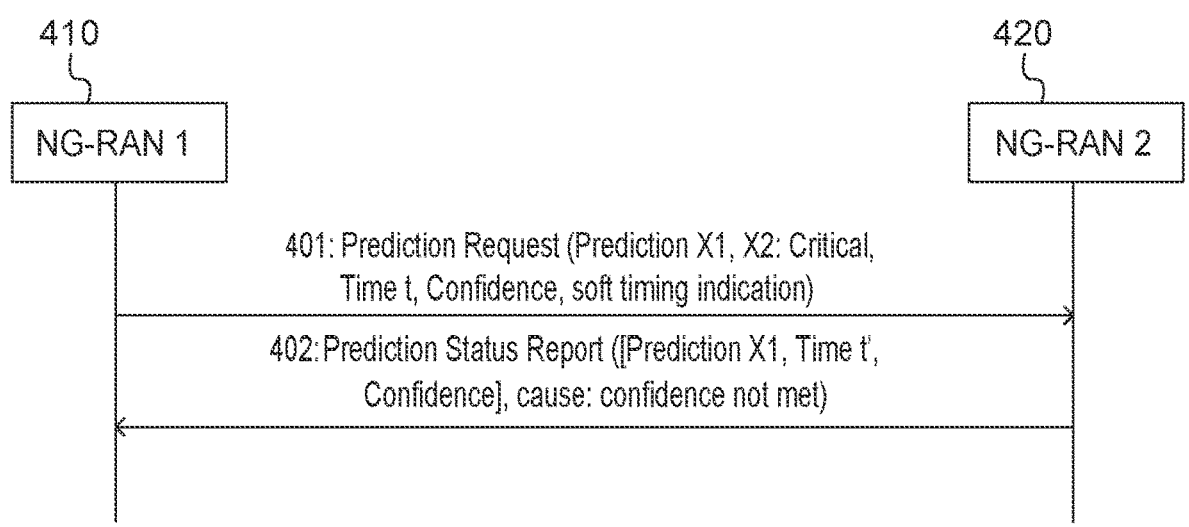
FIG. 4 illustrates an example of a signaling diagram according to certain example embodiments.

FIG. 4 illustrates an example of a signaling diagram depicting a situation where prediction X2 does not meet the required confidence at all, but prediction X1 meets the confidence at a different time instant. This option may be enabled by a node requesting predictions and indicating a "soft timing" in the request with the soft-timing indication, allowing node NG-RAN 2 to meet the requested confidence by controlling the time in the future the prediction is provided. Soft timing indication may also indicate that the prediction request is a "critical" prediction, and that the receiving node should attempt to meet the prediction requirements (e.g., in terms of a confidence) by indicating how to do the adjustment (e.g., by adjusting the time when a prediction is calculated). For example, NE 420 may be enabled to provide a prediction at an earlier point in the future in order to meet the prediction requirements in terms of the required confidence. NE 410 and NE 420 may be similar to NE 1410, as illustrated in FIG. 14, according to certain example embodiments.

In certain example embodiments, signaling may enable a requesting node NE 410 to receive the prediction even though the confidence at the requested time instant is lower. Confidence of a prediction may increase if the prediction is requested at an earlier point in time (i.e., less uncertainty about the random variable to be predicted). NE 410 may include an indication in a request to signal NE 420 that if the requested confidence is not met, NE 420 may provide a prediction at the first possible time when confidence is met which can be a time instant earlier to the original time instant in the future when a prediction is requested. If no such time instant exists, the error cause value may be returned by the node executing AI/ML inference indicating that the prediction confidence could not be provided.

In some example embodiments, NE 410 may not provide a timing indication in the request to implicitly indicate to NE 420 that what matters in the prediction request is the confidence level to be met, rather than the exact time instant where this is possible. NE 420 may test at which time instant in the future its provided inference meets the confidence requirement, and send this prediction to NE 410.

At 401, NE 410 may request two predictions, X1 and X2, from NE 420. NE 410 may include timing information in the request indicating when the prediction needs to be obtained. Timing information per requested prediction may correspond to a timing instance, to an interval of time indicated by two time instances $(t_1, t_2)$, or to a time instance and a time duration $(t_1, T)$. In addition, NE 410 may indicate in the request message a confidence/reliability that the predictions need to satisfy. For example a confidence can be a number in interval [0,1] with 0 indicating that no confidence guarantees are needed for the prediction and 1 indicating that the prediction needs to be 100% accurate. In addition, in the request if timing information is provided NE 410 may indicate that this is a soft indication so that NE 420 may provide the prediction at a different time instant (e.g., at an earlier time in future) so that the required confidence is met.

At 402, NE 420 may determine that it cannot meet the confidence for prediction $X_2$, but prediction $X_1$ may meet the required confidence as long as it is predicted at an earlier time in the future t'<t. NE 420 may also indicate in a response to NE 410 a cause value (i.e., due to "confidence not met") to indicate that the original requirements of the prediction are not satisfied. Although FIG. 4 depicts the reporting occurring in a single transmission, periodic reporting may also be supported by including subsequent messages from NE 420 to NE 410 according to a period defined at the prediction request.

Figure 5:
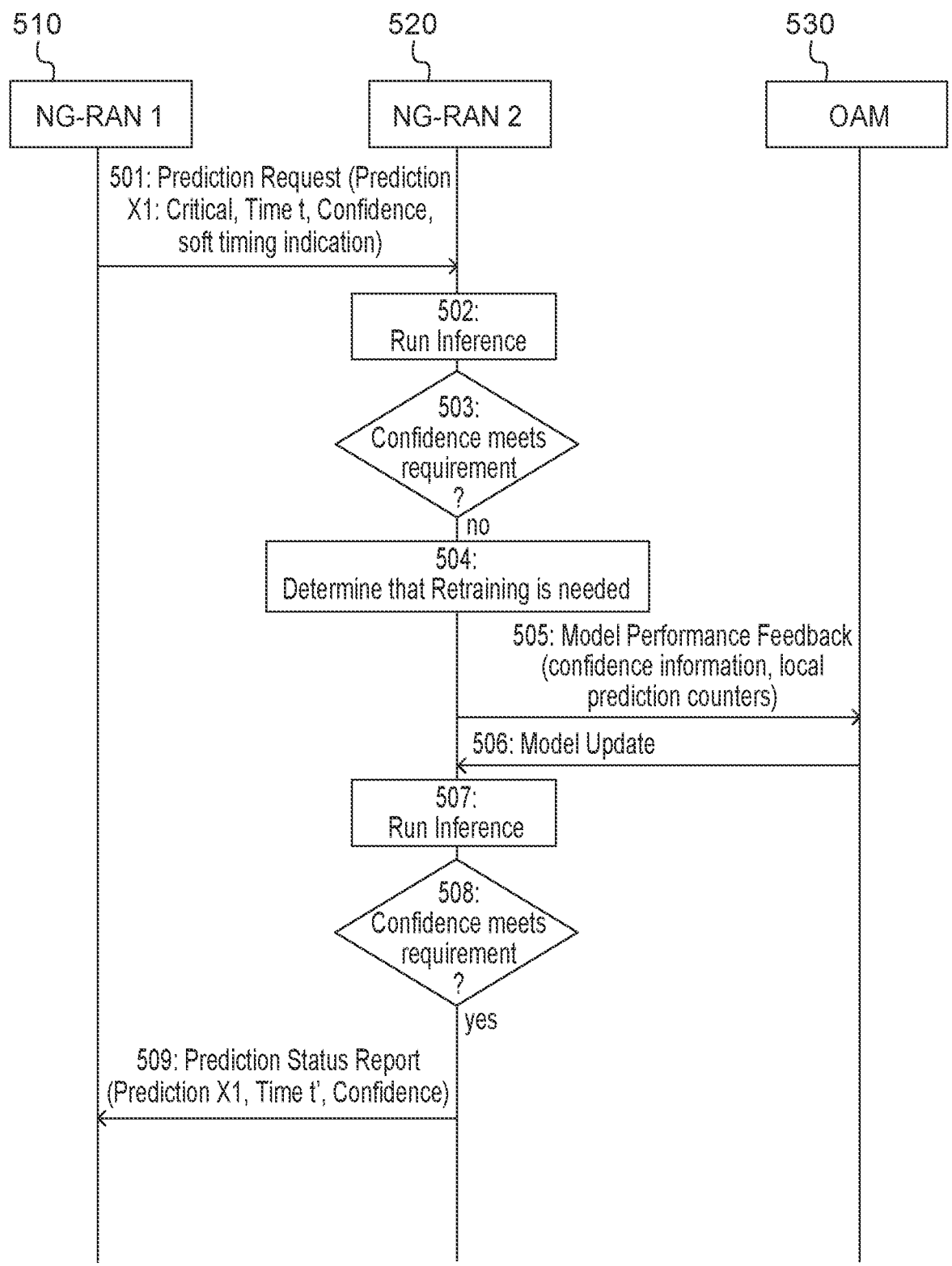
FIG. 5 illustrates an example of a signaling diagram according to some example embodiments.

FIG. 5 illustrates an example of a signaling diagram depicting a situation where a receiving node shall provide a prediction to the requesting node. NE 510, NE 520, and OAM 530 may be similar to NE 1410, as illustrated in FIG. 14, according to certain example embodiments. Specifically, NE 510 may include in the request that the prediction is critical. It may additionally include assistance information towards NE 520 regarding how to meet the prediction requirements. In some example embodiments, it can indicate to NE 520 that if the prediction requirements in terms of a confidence are not met, NE 520 can use soft-timing methods by providing a prediction at an earlier point in time. Additionally, it can indicate that NE 520 can also use retraining of the ML Model. This may be achieved by NE 520 triggering internal retraining (if the ML Model is local at the node) or by requesting retraining of the ML Model from another node hosting the it (e.g., from an OAM). The assistance information may be ordered; specifically, NE 520 may first attempt soft-timing methods, and subsequently retraining of the ML Model since soft-timing appears first in the list of options. In various example embodiments, assistance information may also be unordered, allowing NE 520 to use assistance information in any order. Using assistance information in any order could imply that NE 520 could decide to retrain the ML Model to provide the required confidence. In this case, if NE 520 attempts to tune the model input parameters (e.g., by updating the time to provide the prediction), NE 520 may trigger retraining of the AI/ML model (to itself if the AI/ML model is trained locally or to another entity if the AI/ML model is trained by a different node) to provide the required prediction.

At 501, NE 510 may transmit a prediction request, marked as critical, to NE 520 including a time t, and a confidence that the prediction must satisfy. The request may also indicate that timing information is soft in the sense that NE 520 is able to provide the prediction at a different time instant, and may additionally include other assistance information (e.g., related to retraining indicating that NE 520 is able to retrain the ML model to provide a prediction with the required confidence).

At 502, NE 520 may execute model inference.

At 503, NE 520 may determine that the confidence produced by the model inference does not meet the confidence required by NE 510.

At 504, NE 520 may attempt to provide a model inference at a different time instance to meet the confidence requirement, but the required confidence is not met. In that case, NE 520 may use additional assistance information from NE 510, and determine that retraining of the ML Model may provide the requested confidence value.

At 505, NE 520 may send a model performance feedback to OAM 530 to indicate that the existing ML model needs retraining if OAM is hosting the ML Model. NE 520 may provide information calculated from local counters calculated using predictions along with confidence information.

At 506, OAM 530 may send the updated trained model to NE 520. In various example embodiments, if the model is both trained and executed at NE 520, 504-506 may be performed internally at NE 520.

At 507, NE 520 may execute model inference.

At 508, NE 520 may determine that confidence produced by model inference meets the confidence required by NE 510.

At 509, NE 520 may send the prediction, and its required confidence, to NE 510. This may also happen at a different time in the future t', for example, if a prediction had to be delayed due to the model retraining.

In certain example embodiments, NE 510 may indicate a delta value to allow NE 520 to still report the prediction, even though the prediction does not meet the confidence requirement, as long as it is not delta away from the indicated confidence. In case the confidence function is a smooth function, decay of confidence may be the derivative at confidence of the function. If the function is not differentiable, then decay of confidence is just a "delta" that the confidence is allowed to decrease while keeping the prediction valid. Depending on the derivative of the confidence function with respect to the time a prediction is requested, NE 520 may send predictions of lower confidence to NE 510 as long as they do not exceed delta away from the requirement. Thus, if a "decay of confidence" is indicated in the request message, additionally to the requested confidence, the node producing the predictions may provide a prediction even if it doesn't meet the confidence, as long as it is delta away from the confidence requirement (indicated by the "decay of confidence" parameter). This is the meaning of the decay of confidence argument in the prediction request message in FIG. 5.

In some example embodiments, NE 510 may indicate in the prediction request message that NE 510 wishes to receive prediction information corresponding to a certain confidence range. NE 520 may determine which time interval into the future predictions fulfills the required range of confidence (i.e., an upper and lower bound), and provide those predictions. NE 520 may calculate predictions, compare them to the required confidence, and skip some predictions in case the confidence level is not met. The first prediction provided to NE 510 may meet the confidence. Subsequent predictions may be reported (e.g., in a periodic way or every time a prediction meets the confidence), until either an event is met (e.g., the confidence level indicated in the request is not anymore valid) or a time related trigger happens (e.g., when the time interval where predictions are requested is exceeded).

Figure 6:
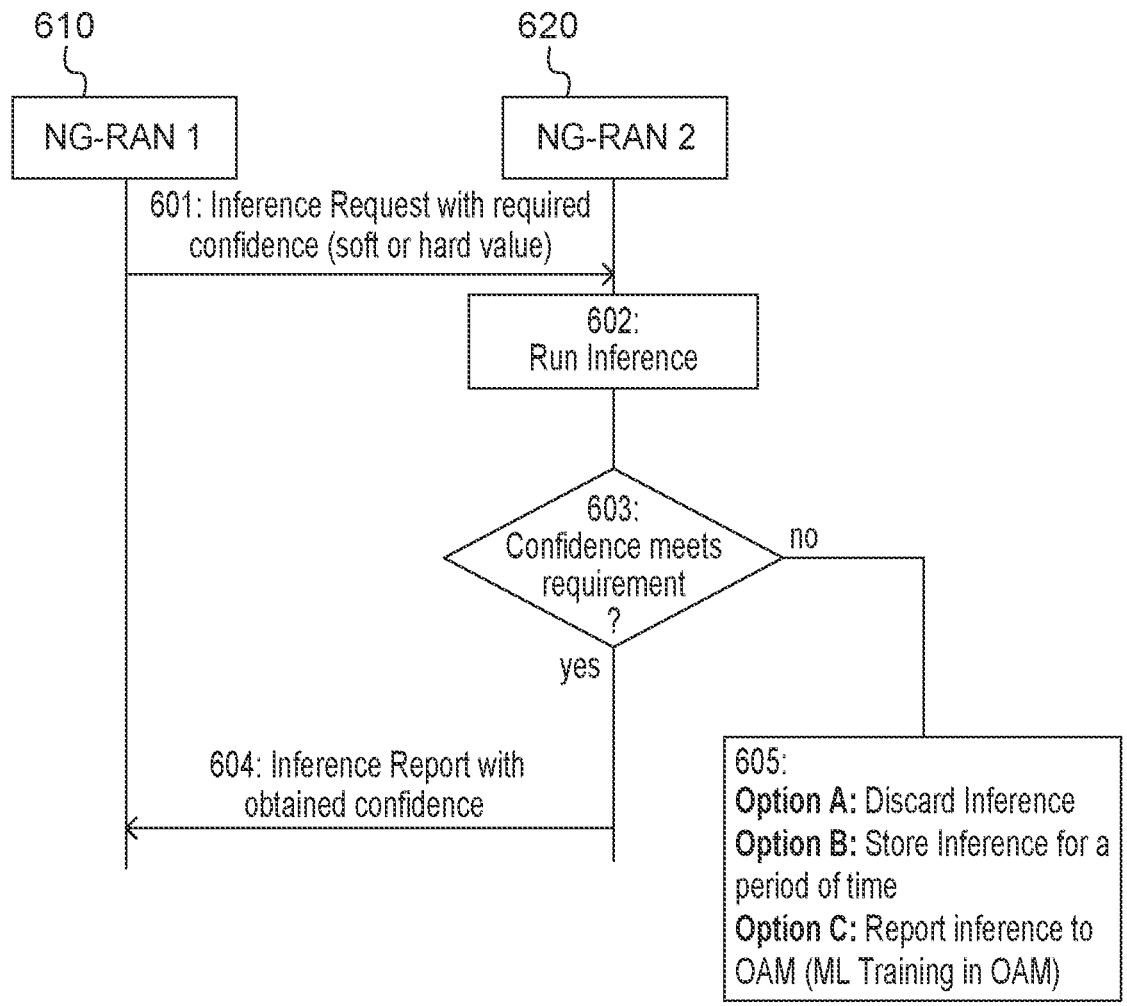
FIG. 6 illustrates an example of a signaling diagram according to various example embodiments.

FIG. 6 illustrates an example of a signaling diagram depicting a model inference check and reporting if it meets confidence criteria, with different options possible when confidence is not met. NE 610 and NE 620 may be similar to NE 1410, as illustrated in FIG. 14, according to certain example embodiments. At 601, NE 610 may request predictions (inference) from NE 620 at a certain confidence. Confidence can be indicated by any of the methods described above. NE 620 may calculate predictions at 602, compare their confidence to the required confidence, and at 603, determine if the confidence level is met. If the confidence level is met, NE 620 may provide the prediction to NE 610 at 604.

If the confidence level is not met, then several options are available at 605. For example, NE 620 may discard the inference if it does not meet the inference confidence requirements. Alternatively, NE 620 may store the inference for a period of time in case the same inference (but with lower confidence) is requested by another neighboring NG-RAN node, also similar to NE 1410. In various example embodiments, NE 620 running inference may report the inference to an OAM. This could be the case if the OAM is the entity that trained the ML model that is being executed at NE 620. Having inference information (on instances when confidence level is not met), could help OAM to retrain the ML model.

Figure 7:
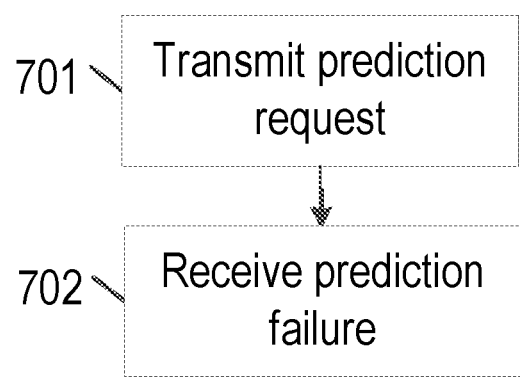
FIG. 7 illustrates an example of a flow diagram of a method according to certain example embodiments.

FIG. 7 illustrates an example of a flow diagram of a method a situation where a prediction reporting procedure fails due to the fact that the provided prediction by a neighboring node does not meet the confidence/reliability requirements placed by the requesting node that may be performed by a requesting NE, such as NE 1410 illustrated in FIG. 14, according to various example embodiments. In this example, NG-RAN 1 is the requesting node that requests the prediction X from NG-RAN 2 where the prediction needs to be calculated at the time indicated by the timing information and must meet a confidence requirement (e.g., 90% confidence). The confidence requirement may implicitly place a requirement on the time that the prediction is valid even though the validity time could also be explicitly indicated in some examples.

Specifically, if the indicated confidence/reliability is not satisfied by the calculated predictions, the receiving NE may not provide those predictions, but should return a failure instead, with an indication (e.g., through a cause value) that the confidence was not met for this prediction. A new cause value may indicate when a requested prediction does not meet the requirements of the prediction request. The receiving NE may provide a subset of the predictions that meet the reliability, and indicate the cause value for predictions that do not meet reliability. In this example, support of the requested prediction by an NG-RAN node is non-critical, allowing the receiving NE to ignore the request if the requested confidence is not met and provide an appropriate cause value. This may be signaled to a neighbor by an indication that the prediction is non-critical in the requesting message.

At 701, the method may include requesting a prediction from a receiving NE, such as NE 1410 illustrated in FIG. 14. The requesting NE may include timing information in the request indicating when the prediction needs to be obtained. Timing information per requested prediction may correspond to a timing instance, to an interval of time indicated by two time instances ($t_1,t_2$), or to a time instance and a time duration ($t_1$, T).

In certain example embodiments, the requesting NE may indicate in the request message a confidence/reliability that the prediction needs to satisfy. For example a confidence can be a number in interval [0,1], with 0 indicating that no confidence guarantees are needed for the prediction, and 1 indicating that the prediction needs to be 100% accurate. In addition, and optionally, the requesting NE may include a "decay of confidence," whereby if the confidence curve is a continuous function, it may correspond to the slope of the curve at the prediction time (i.e., the derivative at this point or the difference of the confidences between different points of the time interval divided by the length of the time interval between these points).

At 702, the method may include receiving from the receiving NE a cause value that the prediction requirement is not met (i.e., if "confidence not met" if the receiving NE cannot provide a prediction meeting the required confidence).

Figure 8:
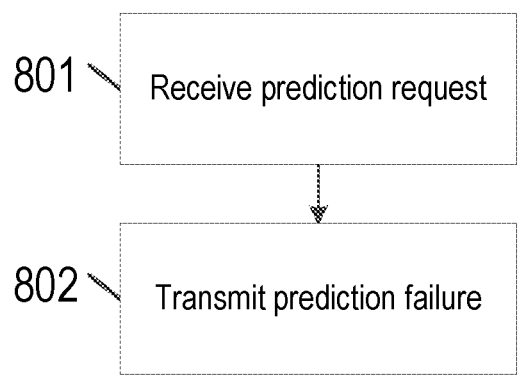
FIG. 8 illustrates an example of a flow diagram of a method according to some example embodiments.

FIG. 8 illustrates an example of a flow diagram of a method a situation where a prediction reporting procedure fails due to the fact that the provided prediction by a neighboring node does not meet the confidence/reliability requirements placed by the requesting node that may be performed by a receiving NE, such as NE 1410 illustrated in FIG. 14, according to various example embodiments. In this example, NG-RAN 1 is the requesting node that requests the prediction X from NG-RAN 2 where the prediction needs to be calculated at the time indicated by the timing information and must meet a confidence requirement (e.g., 90% confidence). The confidence requirement may implicitly place a requirement on the time that the prediction is valid even though the validity time could also be explicitly indicated in some examples.

Specifically, if the indicated confidence/reliability is not satisfied by the calculated predictions, a requesting NE, such as NE 1410 illustrated in FIG. 14, may not provide those predictions, but should return a failure instead, with an indication (e.g., through a cause value) that the confidence was not met for this prediction. A new cause value may indicate when a requested prediction does not meet the requirements of the prediction request. The receiving NE may provide a subset of the predictions that meet the reliability, and indicate the cause value for predictions that do not meet reliability. In this example, support of the requested prediction by an NG-RAN node is non-critical, allowing the receiving NE to ignore the request if the requested confidence is not met and provide an appropriate cause value. This may be signaled to a neighbor by an indication that the prediction is non-critical in the requesting message.

At 801, the method may include receiving a prediction from the requesting NE. The receiving NE may receive timing information in the request indicating when the prediction needs to be obtained. Timing information per requested prediction may correspond to a timing instance, to an interval of time indicated by two time instances ($t_1,t_2$), or to a time instance and a time duration ($t_1$, T).

In certain example embodiments, the receiving NE may be requested for in the request message a confidence/reliability that the prediction needs to satisfy. For example, a confidence can be a number in interval [0,1], with 0 indicating that no confidence guarantees are needed for the prediction, and 1 indicating that the prediction needs to be 100% accurate. In addition, and optionally, the requesting NE may include a "decay of confidence," whereby if the confidence curve is a continuous function, it may correspond to the slope of the curve at the prediction time (i.e., the derivative at this point or the difference of the confidences between different points of the time interval divided by the length of the time interval between these points).

At 802, the method may include transmitting a cause value "confidence not met" if the receiving NE cannot provide a prediction meeting the required confidence.

Figure 9:
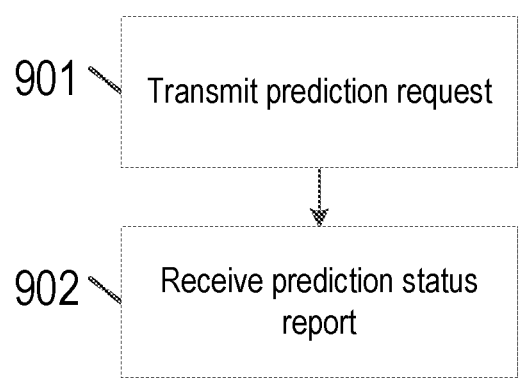
FIG. 9 illustrates an example of a flow diagram of a method according to various example embodiments.

FIG. 9 illustrates an example of a flow diagram of a method of a situation where prediction X2 does not meet the required confidence at all, but prediction X1 meets the confidence at a different time instant. This option may be enabled by a node requesting predictions and indicating a "soft timing" in the request with the soft-timing indication, allowing node NG-RAN 2 to meet the requested confidence by controlling the time in the future the prediction is provided. Soft timing indication may also indicate that the prediction request is a "critical" prediction, and that the receiving node should attempt to meet the prediction requirements (e.g., in terms of a confidence) by indicating how to do the adjustment (e.g., by adjusting the time when a prediction is calculated). For example, a requesting NE, such as NE 1410 illustrated in FIG. 14, according to various example embodiments, may be enabled to provide a prediction at an earlier point in the future in order to meet the prediction requirements in terms of the required confidence.

In certain example embodiments, signaling may enable the requesting NE to receive the prediction even though the confidence at the requested time instant is lower. Confidence of a prediction may increase if the prediction is requested at an earlier point in time (i.e., less uncertainty about the random variable to be predicted). The requesting NE may include an indication in the request to signal a receiving NE, such as NE 1410 illustrated in FIG. 14, that if the requested confidence is not met, the receiving NE may provide a prediction at the first possible time when confidence is met which can be a time instant earlier to the original time instant in the future when a prediction is requested. If no such time instant exists, the error cause value may be returned by the node executing AI/ML inference indicating that the prediction confidence could not be provided.

In some example embodiments, the requesting NE may not provide a timing indication in the request to implicitly indicate to the receiving NE that what matters in the prediction request is the confidence level to be met, rather than the exact time instant where this is possible. The receiving NE may test at which time instant in the future its provided inference meets the confidence requirement, and send this prediction to the requesting NE.

At 901, the method may include requesting at least two predictions, X1 and X2, from the receiving NE. The requesting NE may include timing information in the request indicating when the prediction needs to be obtained. Timing information per requested prediction may correspond to a timing instance, to an interval of time indicated by two time instances $(t_1,t_2)$, or to a time instance and a time duration $(t_1, T)$. In addition, the requesting NE may indicate in the request message a confidence/reliability that the predictions need to satisfy. For example, a confidence can be a number in interval [0,1] with 0 indicating that no confidence guarantees are needed for the prediction and 1 indicating that the prediction needs to be 100% accurate. In addition, in the request if timing information is provided, the requesting NE node may indicate that this is a soft indication so that the receiving NE may provide the prediction at a different time instant (e.g., at an earlier time in future) so that the required confidence is met.

At 902, if the receiving NE determines that it cannot meet the confidence for prediction X2, but prediction X1 may meet the required confidence as long as it is predicted at an earlier time in the future t'<t, the method may include receiving a cause value (i.e., due to "confidence not met"). While the reporting may occur in a single transmission, periodic reporting may also be supported by including subsequent messages from the receiving NE to the requesting NE according to a period defined at the prediction request.

Figure 10:
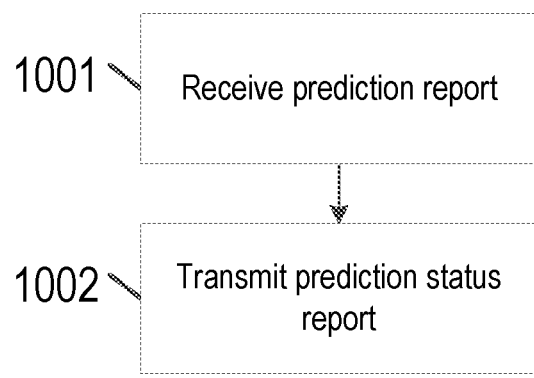
FIG. 10 illustrates an example of a flow diagram of a method according to certain example embodiments.

FIG. 10 illustrates an example of a flow diagram of a method of a situation where prediction X2 does not meet the required confidence at all, but prediction X1 meets the confidence at a different time instant. This option may be enabled by a node requesting predictions and indicating a "soft timing" in the request with the soft-timing indication, allowing node NG-RAN 2 to meet the requested confidence by controlling the time in the future the prediction is provided. Soft timing indication may also indicate that the prediction request is a "critical" prediction, and that the receiving node should attempt to meet the prediction requirements (e.g., in terms of a confidence) by indicating how to do the adjustment (e.g., by adjusting the time when a prediction is calculated). For example, a requesting NE, such as NE 1410 illustrated in FIG. 14, according to various example embodiments, may be enabled to provide a prediction at an earlier point in the future in order to meet the prediction requirements in terms of the required confidence.

In certain example embodiments, signaling may enable a requesting NE, such as NE 1410 illustrated in FIG. 14, to receive the prediction even though the confidence at the requested time instant is lower. Confidence of a prediction may increase if the prediction is requested at an earlier point in time (i.e., less uncertainty about the random variable to be predicted). The requesting NE may include an indication in the request to signal the receiving NE that if the requested confidence is not met, the receiving NE may provide a prediction at the first possible time when confidence is met which can be a time instant earlier to the original time instant in the future when a prediction is requested. If no such time instant exists, the error cause value may be returned by the node executing AI/ML inference indicating that the prediction confidence could not be provided.

In some example embodiments, the requesting NE may not provide a timing indication in the request to implicitly indicate to the receiving NE that what matters in the prediction request is the confidence level to be met, rather than the exact time instant where this is possible. The requesting NE may test at which time instant in the future its provided inference meets the confidence requirement, and send this prediction to the requesting NE.

At 1001, the method may include receiving at least two predictions, X1 and X2, from the requesting NE. The receiving NE may receive timing information in the request indicating when the prediction needs to be obtained. Timing information per requested prediction may correspond to a timing instance, to an interval of time indicated by two time instances $(t_1,t_2)$, or to a time instance and a time duration $(t_1, T)$. In addition, the receiving NE may receive in the request message a confidence/reliability that the predictions need to satisfy. For example a confidence can be a number in interval [0,1] with 0 indicating that no confidence guarantees are needed for the prediction and 1 indicating that the prediction needs to be 100% accurate. In addition, in the request if timing information is provided, the requesting NE may indicate that this is a soft indication so that the receiving NE may provide the prediction at a different time instant (e.g., at an earlier time in future) so that the required confidence is met.

At 1002, the method may include determining that it cannot meet the confidence for prediction X2, but prediction X1 may meet the required confidence as long as it is predicted at an earlier time in the future t'<t. The method may further include indicating in a response to the requesting NE a cause value. For example, the response may indicate the cause as "confidence not met." While the reporting may occur in a single transmission, periodic reporting may also be supported by including subsequent messages from the receiving NE to the requesting NE according to a period defined at the prediction request.

Figure 11:
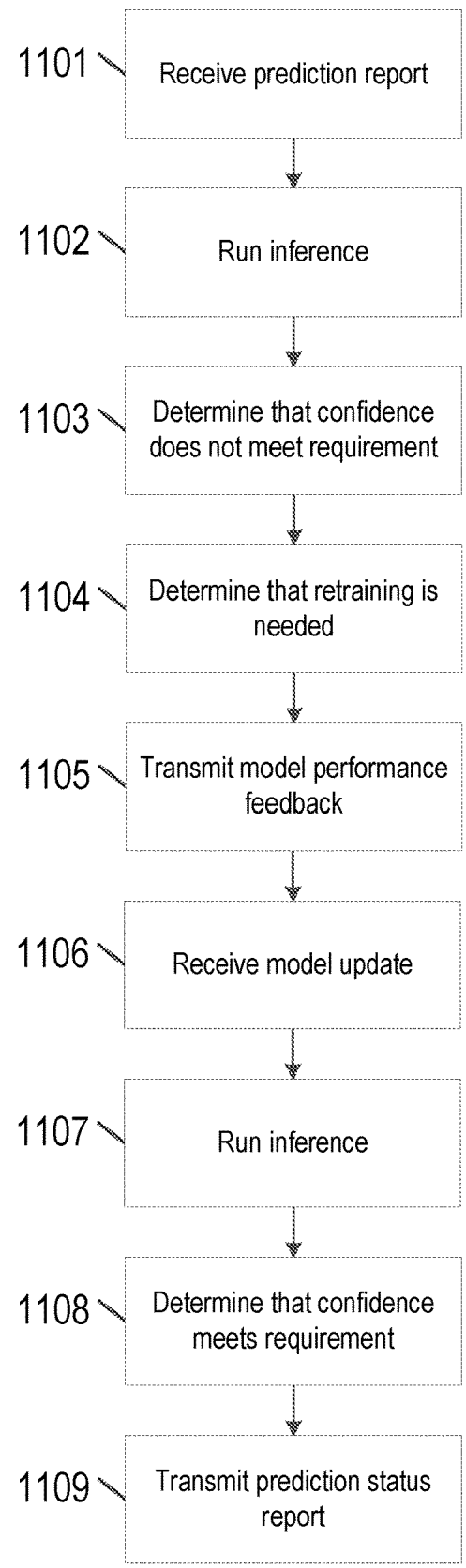
FIG. 11 illustrates an example of a flow diagram of a method according to some example embodiments.

FIG. 11 illustrates an example of a flow diagram of a method where a receiving node shall provide a prediction to the requesting node that may be performed by a receiving NE, such as NE 1410 illustrated in FIG. 14, according to various example embodiments. Specifically, the requesting NE may include in the request that the prediction is critical. Additionally, it may provide assistance information (soft-time, retraining, etc.) on how the node producing a prediction shall try to meet the prediction requirements (e.g., in terms of a confidence). In this case, if the receiving NE cannot tune the model input parameters (e.g., by updating the time to provide the prediction), the receiving NE may trigger retraining of the AI/ML model (to itself if the AI/ML model is trained locally or to another entity if the AI/ML model is trained by a different node) to provide the required prediction according to the assistance information.

At 1101, the method may include receiving a prediction request, marked as critical, from a requesting NE, such as NE 1410 illustrated in FIG. 14, including a time t and a confidence that the prediction must satisfy. The request may also indicate that timing information is soft in the sense that the receiving NE is able to provide the prediction at a different time instant.

At 1102, the method may include executing model inference.

At 1103, the method may include determining that the confidence produced by the model inference does not meet the confidence required by the requesting NE.

At 1104, the method may include attempting to provide a model inference at a different time instance to meet the confidence requirement, but the required confidence is not met. In that case, the method may further include determining that retraining of the ML Model may provide the requested confidence value.

At 1105, the method may include sending a model performance feedback to an OAM to indicate that the existing ML model needs retraining. The receiving NE may provide information calculated from local counters calculated using predictions along with confidence information.

At 1106, the method may include receiving from the OAM an updated trained model. In various example embodiments, if the model is both trained and executed at the receiving NE, 1104-1106 may be internal in the receiving NE.

At 1107, the method may include executing model inference.

At 1108, the method may include determining that confidence produced by model inference meets the confidence required by the requesting NE.

At 1109, the method may include sending the prediction, and its required confidence, to the requesting NE. This may also happen at a different time in the future t', for example, if a prediction had to be delayed due to the model retraining.

In certain example embodiments, the requesting NE may indicate a delta value to allow the receiving NE to still report the prediction, even though the prediction does not meet the confidence requirement, as long as it is not delta away from the indicated confidence. In case the confidence function is a smooth function, decay of confidence may be the derivative at confidence of the function. If the function is not differentiable, then decay of confidence is just a "delta" that the confidence is allowed to decrease while keeping the prediction valid. Depending on the derivative of the confidence function with respect to the time a prediction is requested, the receiving NE may send predictions of lower confidence as long as they do not exceed delta. This is the meaning of the decay of confidence argument in the prediction request message in FIG. 3.

In some example embodiments, the requesting NE may indicate in the prediction request message that the requesting NE wishes to receive prediction information corresponding to a certain confidence range. The receiving NE may determine which time interval into the future predictions fulfills the required range of confidence (i.e., an upper and lower bound), and provide those predictions. The receiving NE may calculate predictions, compare them to the required confidence, and skip some predictions in case the confidence level is not met. The first prediction provided to the requesting NE may meet the confidence. Subsequent predictions may be reported (e.g., in a periodic way or every time a prediction meets the confidence), until either an event is met (e.g., the confidence level indicated in the request is not anymore valid) or a time related trigger happens (e.g., when the time interval where predictions are requested is exceeded).

Figure 12:
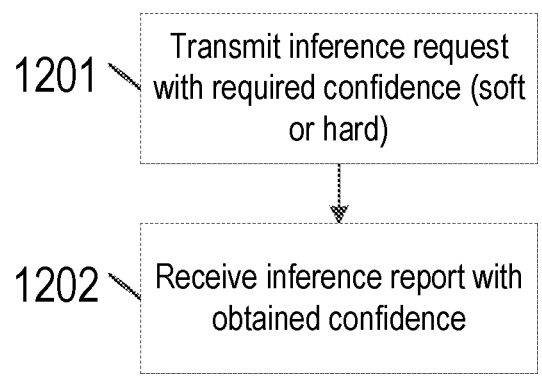
FIG. 12 illustrates an example of a flow diagram of a method according to various example embodiments.

FIG. 12 illustrates an example of a flow diagram of a method for a model inference check and reporting if it meets confidence criteria, with different options possible when confidence is not met that may be performed by a requesting NE, such as NE 1410 illustrated in FIG. 14, according to various example embodiments.

At 1201, the method may include requesting predictions (inference) from a receiving NE, such as NE 1410 illustrated in FIG. 14, at a certain confidence. Confidence can be indicated by any of the methods described above.

At 1202, if the receiving NE determines that confidence level is met, the method may include receiving a prediction from the receiving NE.

Figure 13:
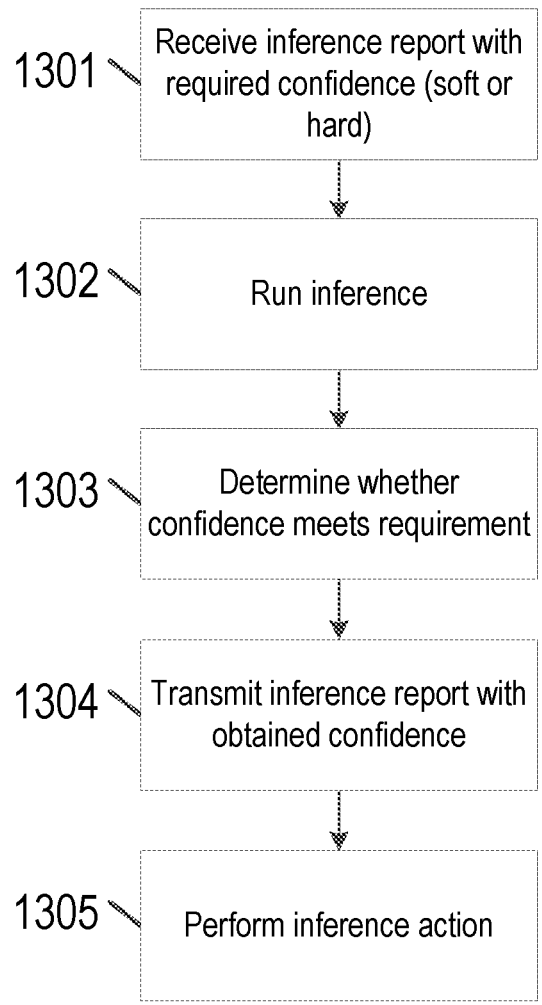
FIG. 13 illustrates an example of a flow diagram of a method according to certain example embodiments.

FIG. 13 illustrates an example of a flow diagram of a method that may be performed by a receiving NE, such as NE 1410 illustrated in FIG. 14, according to various example embodiments.

At 1301, the method may include receiving a request for predictions (inference) from a requesting NE at a certain confidence. Confidence can be indicated by any of the methods described above. The method may include calculating predictions and comparing their confidence to the required confidence at 1302, and at 1303, determining if the confidence level is met. If the confidence level is met, the method may include transmitting the prediction to the requesting NE at 1304.

If the confidence level is not met, then several inference actions may be available at 1305. For example, the receiving NE may discard the inference if it does not meet the inference confidence requirements. Alternatively, the receiving NE may store the inference for a period of time in case the same inference (but with lower confidence) is requested by another neighboring NG-RAN node, similar to NE 1410. In various example embodiments, the receiving NE running inferences may report the inference to an OAM. This could be the case if the OAM is the entity that trained the ML model that is being executed at the receiving NE. Having inference information (on instances when confidence level is not met), could help OAM to retrain the ML Model.

FIG. 14 illustrates an example of a system according to certain example embodiments. In one example embodiment, a system may include multiple devices, such as, for example, NE 1410 and/or UE 1420.

NE 1410 may be one or more of a base station (e.g., 3G UNITS NodeB, 4G LTE Evolved NodeB, or 5G NR Next Generation NodeB), a serving gateway, a server, and/or any other access node or combination thereof.

NE 1410 may further comprise at least one gNB-centralized unit (CU), which may be associated with at least one gNB-distributed unit (DU). The at least one gNB-CU and the at least one gNB-DU may be in communication via at least one F1 interface, at least one $X_n$-C interface, and/or at least one NG interface via a $5^{th}$ generation core (5GC).

UE 1420 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof. Furthermore, NE 1410 and/or UE 1420 may be one or more of a citizens broadband radio service device (CBSD).

NE 1410 and/or UE 1420 may include at least one processor, respectively indicated as 1411 and 1421. Processors 1411 and 1421 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of the devices, as indicated at 1412 and 1422. The memory may be fixed or removable. The memory may include computer program instructions or computer code contained therein. Memories 1412 and 1422 may independently be any suitable storage device, such as a non-transitory computer-readable medium. The term "non-transitory," as used herein, may correspond to a limitation of the medium itself (i.e., tangible, not a signal) as opposed to a limitation on data storage persistency (e.g., random access memory (RAM) vs. read-only memory (ROM)). A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory, and which may be processed by the processors, may be any suitable form of computer program code, for example, a compiled or interpreted computer program written in any suitable programming language.

Processors 1411 and 1421, memories 1412 and 1422, and any subset thereof, may be configured to provide means corresponding to the various blocks of FIGS. 3-13. Although not shown, the devices may also include positioning hardware, such as GPS or micro electrical mechanical system (MEMS) hardware, which may be used to determine a location of the device. Other sensors are also permitted, and may be configured to determine location, elevation, velocity, orientation, and so forth, such as barometers, compasses, and the like.

As shown in FIG. 14, transceivers 1413 and 1423 may be provided, and one or more devices may also include at least one antenna, respectively illustrated as 1414 and 1424. The device may have many antennas, such as an array of antennas configured for multiple input multiple output (MIMO) communications, or multiple antennas for multiple RATs. Other configurations of these devices, for example, may be provided. Transceivers 1413 and 1423 may be a transmitter, a receiver, both a transmitter and a receiver, or a unit or device that may be configured both for transmission and reception.

The memory and the computer program instructions may be configured, with the processor for the particular device, to cause a hardware apparatus, such as UE, to perform any of the processes described above (i.e., FIGS. 3-14). Therefore, in certain example embodiments, a non-transitory computer-readable medium may be encoded with computer instructions that, when executed in hardware, perform a process such as one of the processes described herein. Alternatively, certain example embodiments may be performed entirely in hardware.

In certain example embodiments, an apparatus may include circuitry configured to perform any of the processes or functions illustrated in FIGS. 3-14. As used in this application, the term "circuitry" may refer to one or more or all of the following: (a) hardware-only circuit implementations (such as implementations in only analog and/or digital circuitry), (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions), and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Figure 15:
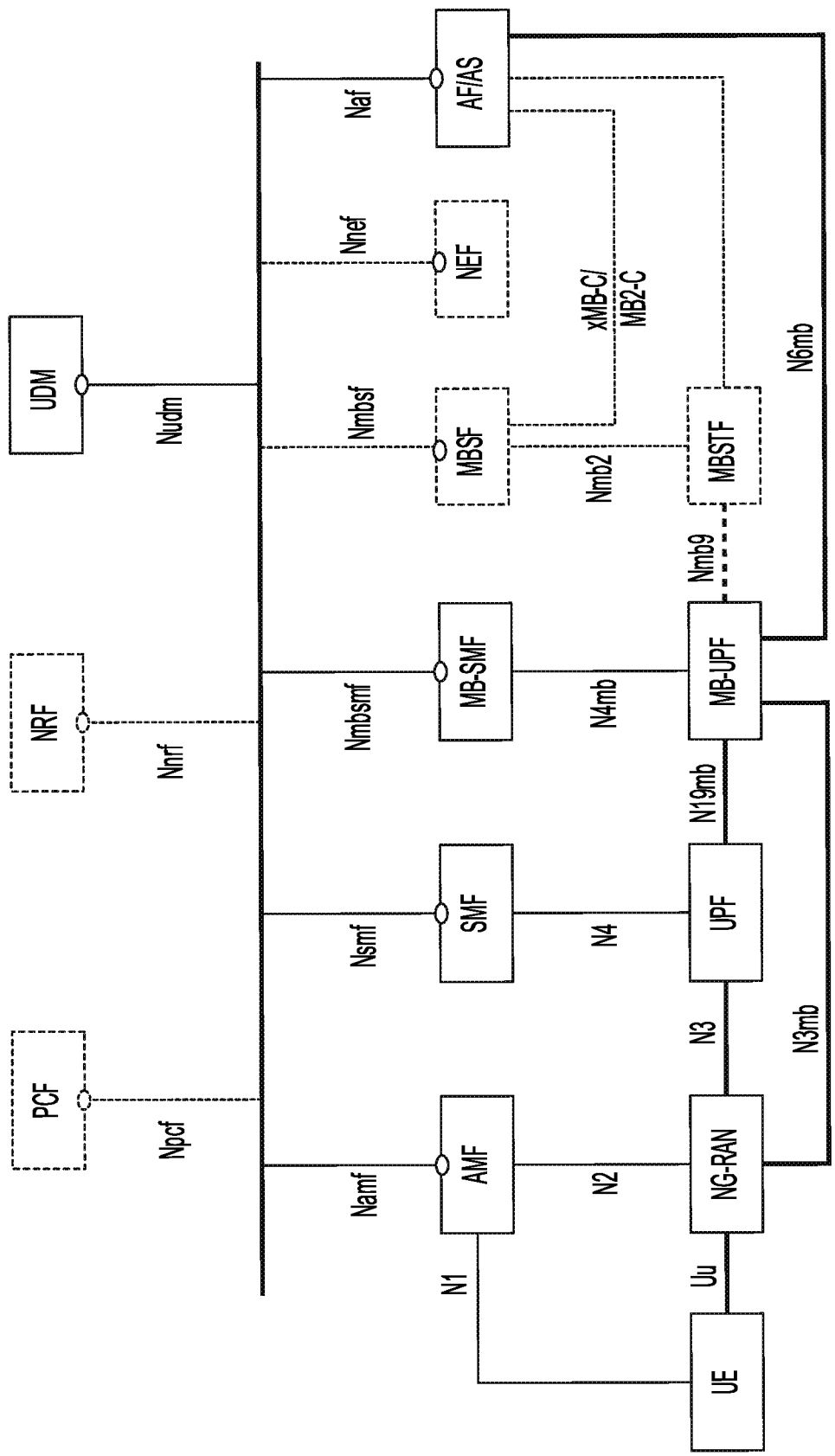
FIG. 15 illustrates an example of a 5G network and system architecture according to various example embodiments.

FIG. 15 illustrates an example of a 5G network and system architecture according to certain example embodiments. Shown are multiple network functions that may be implemented as software operating as part of a network device or dedicated hardware, as a network device itself or dedicated hardware, or as a virtual function operating as a network device or dedicated hardware. The NE and UE illustrated in FIG. 15 may be similar to NE 1410 and UE 1420, respectively. The user plane function (UPF) may provide services such as intra-RAT and inter-RAT mobility, routing and forwarding of data packets, inspection of packets, user plane quality of service (QoS) processing, buffering of downlink packets, and/or triggering of downlink data notifications. The application function (AF) may primarily interface with the core network to facilitate application usage of traffic routing and interact with the policy framework.

According to certain example embodiments, processors 1411 and 1421, and memories 1412 and 1422, may be included in or may form a part of processing circuitry or control circuitry. In addition, in some example embodiments, transceivers 1413 and 1423 may be included in or may form a part of transceiving circuitry.

In some example embodiments, an apparatus (e.g., NE 1410 and/or UE 1420) may include means for performing a method, a process, or any of the variants discussed herein. Examples of the means may include one or more processors, memory, controllers, transmitters, receivers, and/or computer program code for causing the performance of the operations.

In various example embodiments, apparatus 1410 may be controlled by memory 1412 and processor 1411 to receive a prediction request from a requesting network entity comprising timing information indicating when a prediction needs to be obtained, and determine whether the prediction request is critical or non-critical.

Certain example embodiments may be directed to an apparatus that includes means for performing any of the methods described herein including, for example, means for receiving a prediction request from a requesting network entity comprising timing information indicating when a prediction needs to be obtained, and means for determining whether the prediction request is critical or non-critical.

In various example embodiments, apparatus 1410 may be controlled by memory 1412 and processor 1411 to transmit a prediction request to a receiving network entity comprising timing information indicating when the prediction needs to be obtained and an indication of confidence, and receive a response from the receiving network entity associated with the requested prediction.

Certain example embodiments may be directed to an apparatus that includes means for performing any of the methods described herein including, for example, means for transmitting a prediction request to a receiving network entity comprising timing information indicating when the prediction needs to be obtained and an indication of confidence, and means for receiving a response from the receiving network entity associated with the requested prediction.

The features, structures, or characteristics of example embodiments described throughout this specification may be combined in any suitable manner in one or more example embodiments. For example, the usage of the phrases "various embodiments," "certain embodiments," "some embodiments," or other similar language throughout this specification refers to the fact that a particular feature, structure, or characteristic described in connection with an example embodiment may be included in at least one example embodiment. Thus, appearances of the phrases "in various embodiments," "in certain embodiments," "in some embodiments," or other similar language throughout this specification does not necessarily all refer to the same group of example embodiments, and the described features, structures, or characteristics may be combined in any suitable manner in one or more example embodiments.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

Additionally, if desired, the different functions or procedures discussed above may be performed in a different order and/or concurrently with each other. Furthermore, if desired, one or more of the described functions or procedures may be optional or may be combined. As such, the description above should be considered as illustrative of the principles and teachings of certain example embodiments, and not in limitation thereof.

One having ordinary skill in the art will readily understand that the example embodiments discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of the example embodiments.

Partial Glossary

3 GPP $3^{rd}$ Generation Partnership Project
5G $5^{th}$ Generation
5GC 5th Generation Core
6G $6^{th}$ Generation
AF Application Function
AI Artificial Intelligence
ASIC Application Specific Integrated Circuit
CBSD Citizens Broadband Radio Service Device
CPU Central Processing Unit
C-RNTI Cell Radio Network Temporary Identifier
CU Centralized Unit
DU Distributed Unit
eMBB Enhanced Mobile Broadband
eNB Evolved Node B
gNB Next Generation Node B
GPS Global Positioning System
HDD Hard Disk Drive
IoT Internet of Things
LTE Long-Term Evolution
LTE-A Long-Term Evolution Advanced
MEMS Micro Electrical Mechanical System
MIMO Multiple Input Multiple Output
ML Machine Learning
mMTC Massive Machine Type Communication
NE Network Entity
NG Next Generation
NG-eNB Next Generation Evolved Node B
NG-RAN Next Generation Radio Access Network
NR New Radio
OAM Operations, Administration and Maintenance
PDA Personal Digital Assistance
QoS Quality of Service
RAM Random Access Memory
RAN Radio Access Network
RAT Radio Access Technology
RF Radio Frequency
ROM Read-Only Memory
UE User Equipment
UMTS Universal Mobile Telecommunications System
UPF User Plane Function
URLLC Ultra-Reliable and Low-Latency Communication
UTRAN Universal Mobile Telecommunications System Terrestrial Radio Access Network
WLAN Wireless Local Area Network

We claim:

1. A first radio access network (RAN) node comprising:
at least one processor; and
at least one memory storing instructions that, when executed by the at least one processor, cause the first RAN node at least to:
receive a prediction request from a requesting second RAN node comprising timing information indicating when a prediction needs to be obtained, wherein the prediction request comprises a required confidence that the prediction must satisfy; and
determine whether the prediction request is critical or non-critical based on the critical indication,
wherein the at least one memory and the instructions, when executed by the at least one processor, further cause the first RAN node at least to:
calculate the requested prediction; and
determine whether the calculated prediction satisfies the required confidence;
in response to determining that the calculated prediction satisfies the required confidence, transmit a response to the second RAN node, the response comprises an inference report comprising the calculated prediction;
in response to determining that the calculated prediction does not satisfy the required confidence:
if the prediction request is determined to be non-critical, transmit a response to the second RAN node, the response indicating a failure to calculate a prediction which satisfied the required confidence; and
if the prediction request is determined to be critical, take further actions to obtain a prediction matching the required confidence, and transmit a response to the second RAN node, the response comprising the prediction which satisfies the required confidence.

2. The first RAN node of claim 1, wherein the at least one memory and the instructions, when executed by the at least one processor, further cause the first RAN node at least to:
provide a prediction at an earlier point in the future in order to meet the prediction requirements in terms of the required confidence.

3. The first RAN node of claim 1, wherein the timing information corresponds to a timing instance, an interval of time indicated by two time instances, and a time instance and a time duration.

4. The first RAN node of claim 1, wherein the prediction request indicates using a soft timing indication that the prediction is flexible to be provided at a different time instant.

5. The first RAN node of claim 1, wherein, in response to determining that the calculated prediction does not satisfy the confidence or reliability, at least:
discard the calculated prediction;
store the calculated prediction; and
report the calculated prediction to an operations, administration, and maintenance entity.

6. The first RAN node of claim 1, wherein the prediction request comprises an indication of the further actions which the first RAN node should take in response to determining that the calculated prediction does not satisfy the required confidence and if the prediction request is to be critical, wherein the further actions comprise at least:
retraining a machine learning model for calculating the prediction; and
calculating a prediction which satisfies the confidence requirement for a time different to that indicated by the timing information.

7. A method at a first radio access network (RAN) node, the method comprising:
receiving a prediction request from a requesting second RAN node comprising timing information indicating when a prediction needs to be obtained, wherein the prediction request comprises a required confidence that the prediction must satisfy; and determining whether the prediction request is critical or non-critical based on the critical indication, calculating the requested prediction; and determining whether the calculated prediction satisfies the required confidence;

in response to determining that the calculated prediction satisfies the required confidence, transmitting a response to the second RAN node, the response comprising an inference report comprising the calculated prediction;

in response to determining that the calculated prediction does not satisfy the required confidence:
if the prediction request is determined to be non-critical, transmit a response to the second RAN node, the response indicating a failure to calculate a prediction which satisfied the required confidence; and
if the prediction request is determined to be critical, take further actions to obtain a prediction matching the required confidence, and transmit a response to the second RAN node, the response comprising the prediction which satisfies the required confidence.

\* \* \* \* \*